United States Patent
Matthews et al.

(10) Patent No.: US 6,457,237 B1
(45) Date of Patent: *Oct. 1, 2002

(54) METHOD OF KERFING INSULATION BOARDS TO FORM DUCT LINERS

(75) Inventors: Kent R. Matthews, Littleton; Eric G. Schakel, Sedalia, both of CO (US)

(73) Assignee: Johns Manville International, Inc., Denver, CO (US)

( * ) Notice: Subject to any disclaimer, the term of this patent is extended or adjusted under 35 U.S.C. 154(b) by 217 days.

This patent is subject to a terminal disclaimer.

(21) Appl. No.: 09/293,470

(22) Filed: Sep. 22, 2000

Related U.S. Application Data

(63) Continuation of application No. 08/528,448, filed on Sep. 14, 1995, now Pat. No. 5,953,818.

(51) Int. Cl.[7] .................................................. B23P 15/00
(52) U.S. Cl. .................................. 29/890.144; 29/897.3
(58) Field of Search ........................ 29/890.14, 890.144, 29/897.3; 83/875, 877; 138/149, 151, 156

(56) References Cited

U.S. PATENT DOCUMENTS

| | | | |
|---|---|---|---|
| 3,605,534 A | * | 9/1971 | Barr |
| 4,411,183 A | * | 10/1983 | Auer |
| 4,576,206 A | * | 3/1986 | Lauren |
| 4,823,845 A | * | 4/1989 | Martin et al. |
| 4,838,968 A | * | 6/1989 | Nelson |
| 5,024,131 A | * | 6/1991 | Weidman |
| 5,134,917 A | * | 8/1992 | Holland |
| 5,232,762 A | * | 8/1993 | Rudy |
| 5,310,594 A | * | 5/1994 | Holland et al. |
| 5,567,304 A | * | 10/1996 | Schakel et al. |

FOREIGN PATENT DOCUMENTS

| | | | |
|---|---|---|---|
| AT | 376392 | * | 11/1984 |
| EP | 644036 | * | 3/1995 |
| FR | 2409855 | * | 6/1979 |
| GB | 391541 | * | 5/1933 |
| WO | WO 92/18330 | * | 10/1992 |

* cited by examiner

*Primary Examiner*—David P. Bryant
(74) *Attorney, Agent, or Firm*—Robert D. Touslee

(57) ABSTRACT

Ducts are formed from rigid or semi-rigid insulation boards by forming a plurality of longitudinally extending, spaced apart, parallel kerfs in a first major surface of each of the insulation boards which is adapted to be the interior surface of the duct. When the insulation board is formed into a duct of the preselected dimensions, the shoulders of the kerfs adjoining the interior surface of the duct abut and, preferably, the insulation material in the shoulders of the kerfs is compressed. The flexibility of the insulation boards, in the direction of the widths of the insulation boards, is controlled by increasing the depths and/or the widths of the kerfs and/or decreasing the spacing between the kerfs to make the insulation board more flexible and by decreasing the depths and/or the widths of the kerfs and/or increasing the spacing between the kerfs to make the insulation board less flexible.

6 Claims, 2 Drawing Sheets

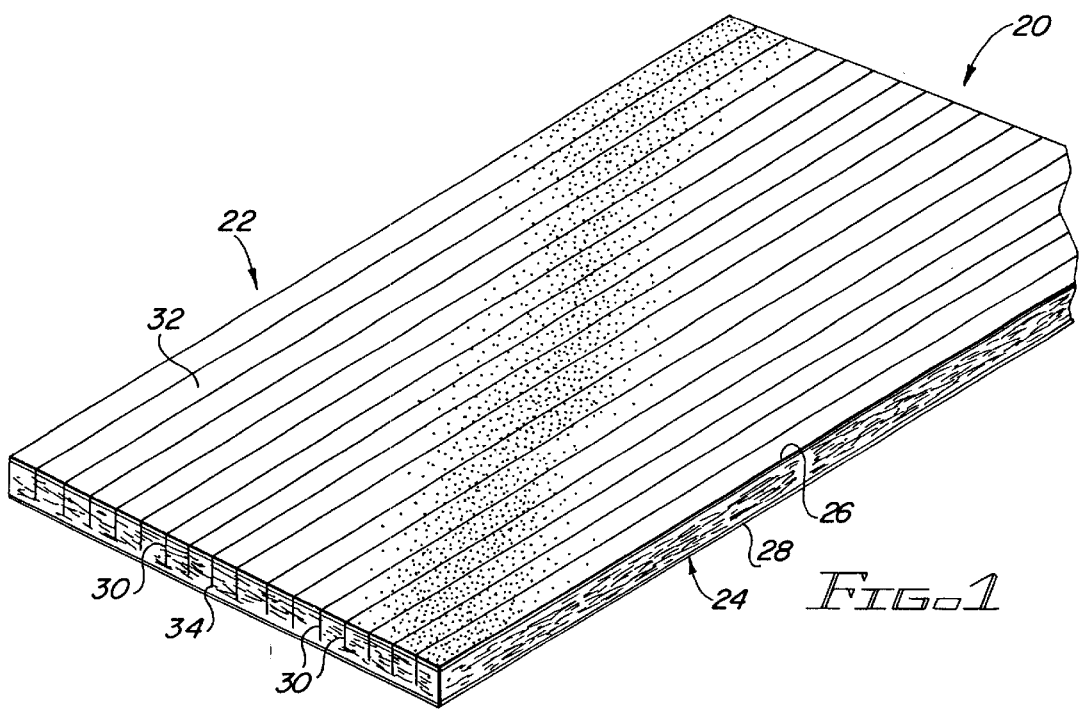
Fig. 1
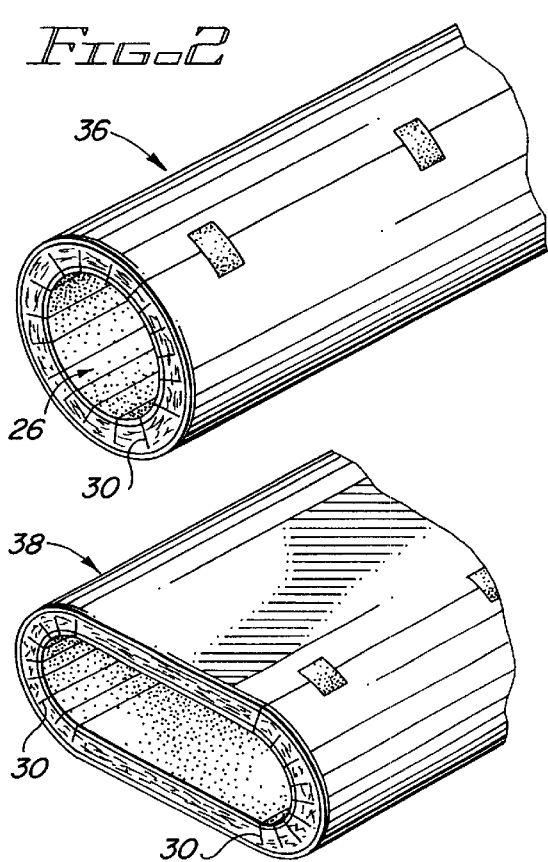
Fig. 2
Fig. 4
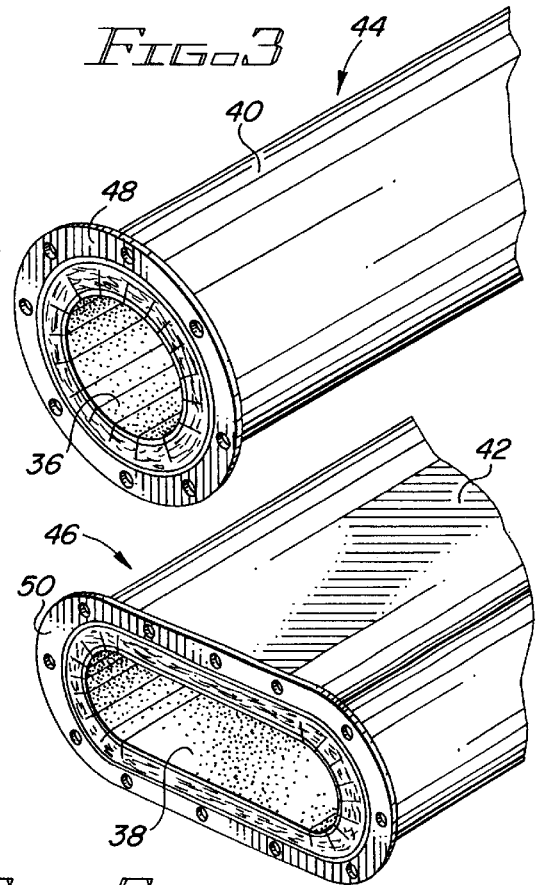
Fig. 3
Fig. 5

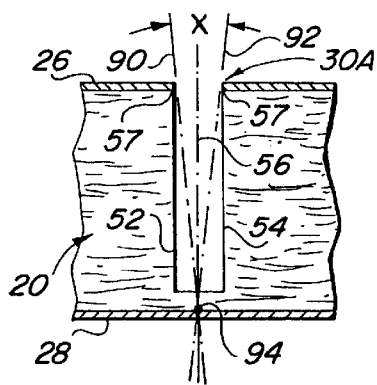
FIG_6
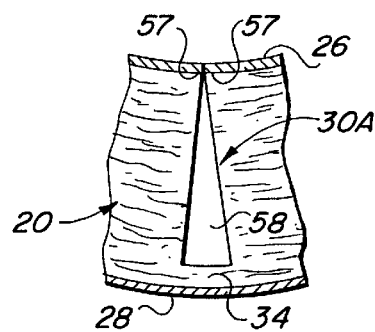
FIG_6A
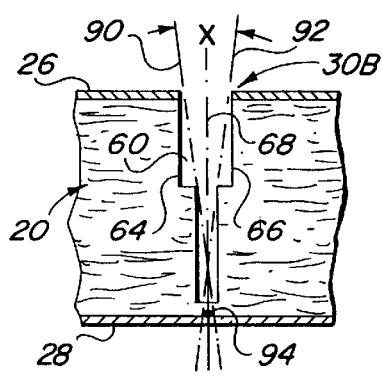
FIG_7
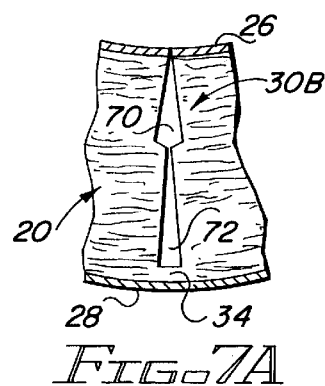
FIG_7A
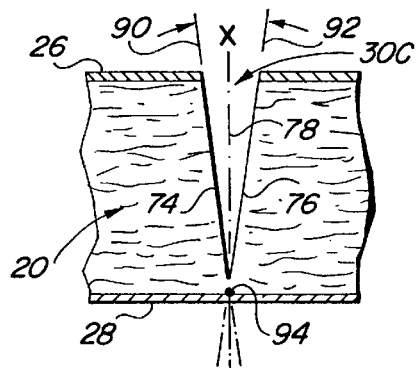
FIG_8
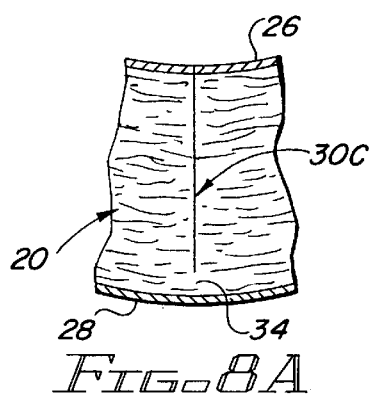
FIG_8A
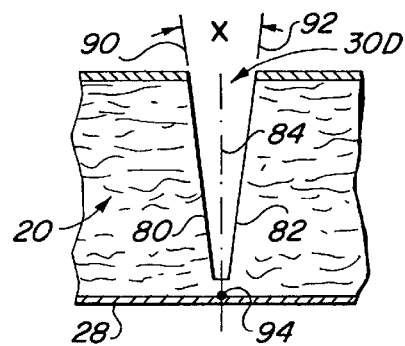
FIG_9
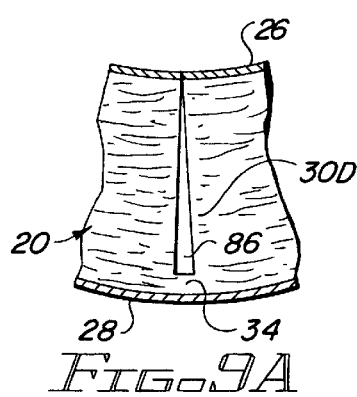
FIG_9A

METHOD OF KERFING INSULATION BOARDS TO FORM DUCT LINERS

This application is a continuation of patent application Ser. No. 08/528,448, filed Sep. 14, 1995, now U.S. Pat. No. 5,953,818.

BACKGROUND OF THE INVENTION

The present invention is directed to ducts and duct liners and to a method of forming ducts and duct liners from rigid and semi-rigid insulation boards wherein the configuration of the kerfs formed in the insulation boards as well as the depths, widths and spacing of the kerfs in the insulation boards, control the flexibility of the insulation boards and the structural compression characteristics of the kerf sidewalls or shoulders to facilitate the formation of ducts and duct liners of desired diameters from the insulation boards.

Heating, ventilating and air conditioning systems, exhaust systems and other similar gas flow systems found in large building structures, such as, but not limited to convention centers, sports domes, warehouses, factories and the like require large diameter, high capacity, insulated round or flat oval air ducts for conveying conditioned air from air conditioning units to locations throughout the building structure and for returning air to the air conditioning units for heating or cooling and recirculation or for conveying other gases such as exhaust gases. These large diameter, insulated round or flat oval air ducts typically range from about twenty inches to over one hundred inches in diameter.

Presently, the most commonly used ducts for such large, high capacity, air and gas flow systems are double wall insulated metal ducts. These large diameter, high capacity, metal ducts for conveying air and other gases comprise an outer tubular metal shell, an inner perforated tubular metal shell and one or more layers of glass fiber insulation blankets or other insulation materials intermediate the outer tubular shell and the inner tubular shell. These ducts normally have either a round or a flat oval transverse cross section. Due to their construction which, in essence, comprises a first tubular metal duct contained within a second tubular metal duct, and the labor required to both assemble the first metal duct within the second metal duct and insulate the space between the ducts while maintaining the ducts concentric with respect to each other, these double wall, insulated metal ducts for conveying gases, such as conditioned air, return air, exhaust gases and the like, are relatively expensive.

A second duct, currently in use for conveying gases, comprises a round, tubular metal shell internally lined with a round tubular, preformed, self-supporting, molded, glass fiber insulation sold by Schuller International Inc., under the trademark "SPIRACOUSTIC". This duct system exhibits good thermal and acoustical insulating properties and eliminates the need for a costly perforated metal liner. However, because of manufacturing restrictions relating to the molding of the glass fiber insulation into its tubular shape, this duct system has been size restricted for use with tubular metal shells having internal diameters of twenty-six inches or less.

Thus, although the molded glass fiber insulation liners provide a cost effective lining system with good performance characteristics for tubular metal ducts having internal diameters of twenty-six inches or less, there has been a need to provide large diameter air and gas handling ducts with an insulated lining system other than the costly perforated metal lining system discussed above.

SUMMARY OF THE INVENTION

The ducts and duct liners of the present invention comprise rigid or semi-rigid insulation boards (commonly referred to as "duct boards") which have a plurality of parallel kerfs (narrow grooves) in their gas stream surfaces that enable the insulation boards to be curved or bent about an axis parallel to the kerfs into tubular shapes to form ducts or duct liners. Typically, the insulation boards are made of a fibrous insulation, a cellular foam insulation or a fibrous and cellular foam insulation laminate. The insulation boards are typically four feet by ten feet or eight feet by ten feet and from about one inch to about four inches thick. For the purposes of this application the dimension of the insulation board parallel to the kerfs is defined as the length of the insulation board and the dimension of the insulation board perpendicular to the kerfs is defined as the width of the insulation boards.

Where the duct or duct liner being formed has a circumference equal to or less than the width of a kerfed insulation board, the insulation board or a portion thereof is bent and formed into a tube of the desired diameter with the abutting lateral edges of the insulation board preferably being taped or otherwise held together. As a duct liner, the duct is then inserted into a tubular metal shell having internal dimensions equal to or slightly less than the external dimensions of the duct liner. Where the duct or duct liner being formed has a circumference greater than the width of a kerfed insulation board, the insulation board is taped or otherwise affixed to a second insulation board or portion thereof and the joined insulation boards are bent and formed into a tube of the desired diameter which can be inserted into a tubular metal shell.

The gas stream surfaces of the insulation boards may be treated or untreated. However, with respect to fibrous insulation boards, preferably, the gas stream surfaces of the insulation boards are provided with a coating, such as a polymeric coating, or are provided with a facing to encapsulate fibers and/or particles of the insulation boards within the insulation boards.

The kerfs formed in the gas stream surfaces of the insulation boards, to enable the insulation boards to be bent into a tubular shape, are sized so that the shoulders of the kerfs adjoining the air stream surfaces of the insulation boards close together and are subjected to compression when the insulation boards are bent into a tubular shape of the desired dimensions for the duct or duct liner being fabricated. With the insulation material of the insulation boards in compression at the shoulders of the kerfs, the insulation boards retain the tubular shape into which the insulation boards have been formed. If the kerfs are to wide, the shoulders of the kerfs adjoining the gas stream surfaces of the insulation boards are not subjected to compression when the insulation boards are bent and shaped into a tubular configuration of the desired dimensions and the duct or duct liners formed from the insulation boards do not retain the desired tubular shape. Furthermore, since the kerfs formed in the insulation panels of the ducts or duct liners of the present invention close together at the gas stream surface of the ducts or duct liners, fibers or dust in the kerf sidewalls are not exposed to the interior of the ducts or duct liners and the air or other gas streams being conveyed by the ducts.

In one preferred embodiment of the present invention, the narrow kerfs have straight sidewalls extending perpendicular to the gas stream surfaces of the insulation boards with shoulders adjoining the gas stream surface which close when the insulation boards are bent and curved into the desired tubular shape. While the sidewalls of these kerfs meet at the gas stream surfaces of the insulation boards to place the shoulders of the kerfs adjoining the gas stream surface of the duct in compression and to seal off the kerfs, a series of air spaces, having triangular cross sections, are formed in the walls of the ducts or duct liners formed from the insulation boards. These air spaces reduce the insulating properties of the ducts or duct liners formed from the insulation boards and when using kerfs with straight sidewalls which extend perpendicular to the gas stream surfaces of the insulation boards, the sizes of these air spaces increase as the thicknesses of the insulation boards used to form the ducts or duct liners are increased.

Vee-shaped kerfs or substantially vee-shaped kerfs can eliminate or substantially eliminate the air spaces within the walls of the ducts formed from the kerfed insulation boards of the present invention and, to assure optimum insulating characteristics in the ducts or duct liners formed from the kerfed insulation boards, vee-shaped kerfs or substantially vee-shaped kerfs should be used in insulation boards two inches thick or greater. However, if the vee-shaped kerfs are too wide at the gas stream surfaces of the insulation boards, the shoulders of the kerfs adjoining the gas stream surfaces of the insulation boards do not close together and are not subjected to compression when the insulation boards are formed into a tubular shape. As discussed above, the insulation material in the shoulders of the kerfs and preferably, extending for the entire or substantially the entire depth of the sidewalls, should be subjected to compression so that the insulation boards will retain the tubular shape into which the insulation boards have been formed and the shoulders should be closed together so that fibers and/or particles in the kerf sidewall surfaces are not exposed to the interior of the ducts and the high velocity gas streams being conveyed by the ducts. Thus, the kerfs formed in the gas stream surfaces of the insulation boards in accordance with a preferred embodiment of the present invention have vee-shaped or substantially vee-shaped cross sections with the widths of the kerfs at the gas stream surfaces of the insulation boards being controlled so that the air spaces in the walls of the ducts or duct liners formed from the insulation boards are eliminated or substantially eliminated and the shoulders of the kerfs adjoining the gas stream surfaces of the insulation boards and, preferably, the entire or substantially the entire remaining portions of the kerf sidewalls are placed under compression when the insulation boards are formed into the duct or duct liner of preselected dimensions.

The flexibility of the insulation boards, in the direction of the widths of the insulation boards, may be controlled by the depth, width and/or spacing of the kerfs formed in the gas stream surface of the insulation boards. An insulation board with kerfs of a certain depth and width that are spaced from each other a certain spacing will exhibit a certain flexibility. To make the insulation boards more flexible, the depths of the kerfs can be increased, the widths of the kerfs can be increased and/or the spacing between kerfs can be decreased. To make the insulation boards less flexible, the depths of the kerfs can be decreased, the widths of the kerfs can be decreased and/or the spacing between the kerfs can be increased.

BRIEF DESCRIPTION OF THE DRAWINGS

FIG. 1 is an insulation board of the present invention with a kerfed gas stream surface.

FIG. 2 is a duct or duct liner of the present invention, with a round transverse cross section, formed from a kerfed insulation board.

FIG. 3 is a duct of the present invention comprising a tubular metal shell, with a round transverse cross section, lined with a duct liner formed from a kerfed insulation board.

FIG. 4 is a duct or duct liner of the present invention, with a flat oval transverse cross section, formed from a kerfed insulation board.

FIG. 5 is a duct of the present invention comprising a tubular metal shell, with a flat oval transverse cross section, lined with a duct liner formed from a kerfed insulation board.

FIG. 6 is a schematic fragmentary section through an insulation board showing a kerf with straight sidewalls and a rectangular cross section.

FIG. 6A is a schematic fragmentary section through the insulation board of FIG. 6 showing the kerf after the insulation board has been bent to form a tubular shape.

FIG. 7 is a schematic fragmentary section through an insulation board showing a kerf with stepped sidewalls to approximate a vee-shaped cross section.

FIG. 7A is a schematic fragmentary section through the insulation board of FIG. 7 showing the kerf after the insulation board has been bent to form a tubular shape.

FIG. 8 is a schematic fragmentary section through an insulation board showing a kerf with a vee-shaped transverse cross section.

FIG. 8A is a schematic fragmentary section through the insulation board of FIG. 8 showing the kerf after the insulation board has been bent to form a tubular shape.

FIG. 9 is a schematic fragmentary section through an insulation board showing a kerf with a substantially vee-shaped transverse cross section.

FIG. 9A is a schematic fragmentary section through the insulation board of FIG. 9 showing the kerf after the insulation board has been bent to form a tubular shape.

DESCRIPTION OF THE PREFERRED EMBODIMENTS

FIG. 1 shows an insulation board 20 having a first major surface 22 which is a gas stream or interior surface and a second major surface 24 which is an outside surface. The insulation board 20 may be a rigid or semi-rigid insulation board comprising a fibrous insulation material, such as a glass fiber insulation, a cellular foam material, such as a polyimide foam insulation, or a composite board of fibrous insulation and cellular foam insulation.

In certain industrial applications, such as the handling of exhaust gases where coated or faced gas stream surfaces are not required on the duct or duct liner formed from the insulation board and/or where the duct or duct liner formed from the insulation board is to be frequently replaced, the gas stream surface 22 of the insulation board may be untreated as an additional cost savings. However, preferably, the gas stream surface has a coating or facing 26 covering the gas stream surface, such as but not limited to, a polymeric coating, a non-combustible foil facing, a synthetic polymer film, a metallic foil composite or a treated, non-woven mat (e.g. a polyester mat coated with a polymeric coating). For insulation boards 20 that are going to be formed into ducts or duct liners for heating, ventilating and air conditioning systems, a polymeric coating on the gas stream surface of the insulation board can add to the performance characteristics of the duct system and permit regular maintenance and cleaning or the ducts or duct liners. In addition, the polymeric coating can be applied to the gas stream surface before or after the kerfing operation. The use of a non-combustible foil, a synthetic polymer film, a metallic foil composite or a treated non-woven mat as a facer on the gas stream surface of the insulation board is advantageous when the insulation boards are going to be formed into ducts or duct liners for certain industrial and commercial operations and also may offer certain cost savings over the polymeric coating.

The outside surface 24 of the insulation board 20 is preferably, provided with a moisture barrier facing 28, such as but not limited to a foil-scrim-kraft facing. The use of a moisture barrier facing prevents the buildup of moisture between the outer surface of a duct liner formed from the insulation board and an outer metal shell.

The insulation boards 20 are typically about ten feet long by four feet wide or eight feet wide and range in thickness from about one inch to about four inches. The glass fiber insulation boards typically used in the present invention include a phenolic binder and have a density ranging from about 2.4 to about 4.5 lbs/cu.ft. Cellular foam insulation boards typically used in the present invention have a density ranging from about 0.5 to about 2.0 lbs/cu.ft.

As shown in FIG. 1, the gas stream surface 22 of the insulation board 20 is provided with a plurality of kerfs 30. The kerfs 30 extend the length of the insulation board, are spaced with respect to each other and extend parallel with respect to each other. The kerfing of the insulation board 20 forms a plurality of longitudinally extending segments 32 which are hinged together by the hinge portions 34 of the insulation boards intermediate the bottoms of the kerfs 30 and the outside surfaces 24 of the insulation boards plus the facings 28 on the outside surfaces of the insulation boards. Preferably, the kerfs 30 are formed by a plurality of appropriately spaced and driven steel, ceramic or carbide saw blades.

When the insulation boards 20 are to be formed into ducts or duct liners ranging in diameter from about sixteen inches to about thirty inches, the spacing between the kerfs 30 is preferably/2 inches or 1.57 inches on centers. When the insulation boards 20 are to be formed into ducts or duct liners ranging in diameter from about thirty inches to one hundred inches or more, the spacing between the kerfs is preferably or 2 inches on centers. The kerfing of the insulation board 20 allows the insulation board to be bent or curved in the direction of its width to enable the insulation board to be formed into the tubular shape of a duct or duct liner. The kerfs 30 can not be placed too close together or the insulation material of the insulation board in the longitudinal segments 32 will lose its integrity. If the kerfs 30 are spaced too far apart, the insulation board 20 will not have the flexibility in the direction of its width to enable the insulation board to be bent and curved into a tubular shape of the desired dimensions.

The kerfs 30 are narrow and typically have a width at the gas stream surface of the insulation board of about 3/32 of an inch for insulation boards one and one half inches in thickness or less. The depths of the kerfs 30 preferably range from about 70% to about 90% of the thickness of the insulation boards 20. Thus, the hinge portions 34 of the kerfed insulation boards intermediate the longitudinal segments 32 are typically about one quarter to one half of an inch thick.

As shown in FIGS. 2 and 4, after the insulation board 20 has been formed into a duct 36 or 38 respectively, the lateral edges of the insulation board are taped or otherwise secured together so that the insulation board will remain in its round or flat oval tubular configuration. The duct may then be inserted into a metal shell 40 or 42 to form a duct liner for the metal shell and form a round or flat oval insulated metal duct 44 or 46, as shown in FIGS. 3 and 5. As discussed above, if the internal circumference of the metal shell being lined is greater than the width of the insulation board 20, a portion of another insulation board can be secured to the insulation board to obtain the needed width.

The outer tubular metal shells 40 and 42 used in the present invention are typically conventional tubular shells commonly used for industrial and commercial applications. The round or flat oval outer tubular shells are typically made of spirally wound sheet metal strips with adjacent convolutions of the metal strips joined by a conventional spiral seam. The insulated metal ducts may be joined together by male/female connectors; sleeves; outer flanges, such as the flanges 48 and 50 shown in FIGS. 3 and 5; or other conventional means.

FIGS. 6 through 9A schematically represent various transverse cross sectional shapes which may be used for the kerfs 30 formed in the insulation boards 20 of the present invention. FIGS. 6, 7, 8, and 9 represent the transverse cross sections of the kerfs 30 as formed in the insulation board 20 prior to forming the insulation board into a tubular configuration to form a duct or duct liner 36 or 38. FIGS. 6A, 7A, 8A and 9A represent the transverse cross sections of the kerfs 30 after the insulation board 20 has been bent or curved into a tubular configuration to form a duct or duct liner 36 or 38 of preselected transverse dimensions.

As shown in FIGS. 6 and 6A, the kerf 30a has a narrow rectangular or substantially rectangular transverse cross section with sidewalls 52 and 54 which extend perpendicular or substantially perpendicular to the gas stream surface 22 of the insulation board 20 and parallel or substantially parallel to a plane 56 extending perpendicular to the gas stream surface 22 of the insulation board and bisecting the kerf 30a along the longitudinal centerline of the kerf. The kerf 30a also has shoulders 57, adjoining the gas stream surface 22 of the insulation board 20. When the insulation board 20 is bent or formed into a tubular configuration to form a duct or duct liner as shown in FIG. 6A, the shoulders 57 of the kerf 30a, adjoining the gas stream surface 22 of the insulation board 20, come together, but there is a triangular air space 58 formed in the wall of duct or duct liner. Preferably, the shoulders 57 of the kerf 30a not only abut when the insulation board is bent into a desired tubular configuration of preselected transverse dimensions, but the shoulders are pressed together, when the insulation board is formed into the desired tubular configuration of the preselected transverse dimensions, with sufficient force to compress the insulation material in the shoulders 57 of the kerf 30a so that the tubular shape of the duct or duct liner formed from the insulation board 20 is retained after the insulation board has been formed into a duct or duct liner.

As shown in FIGS. 7 and 7A, the narrow kerf 30b has an upper portion 60 and a lower portion 62 which are both rectangular or substantially rectangular in transverse cross section with the lower portion 62 of the kerf 30b being narrower than the upper portion 60. The stepped diverging sidewalls 64 and 66 of the kerf 30b each comprise upper and lower portions which extend perpendicular or substantially perpendicular to the gas stream surface 22 of the insulation board and parallel or substantially parallel to a plane 68 extending perpendicular to the gas stream surface 22 of the insulation board and bisecting the kerf 30b along a longitudinal centerline of the kerf. The upper and lower portions of each of the sidewalls are joined by an intermediate section which extends at an angle to the plane 68. The kerf 30b also has shoulders 69 adjoining the gas stream surface 22 of the insulation board 20. When the insulation board 20 is bent or formed into a tubular configuration to form a duct or duct liner as shown in FIG. 7A, the shoulders 57 of the kerf 30b, adjoining the gas stream surface 22 of the insulation board, come together. While there are two small substantially triangular air spaces 70 and 72 formed in the wall of the duct or duct liner, the combined volume of the spaces 70 and 72 is less than the volume 58 formed by using a kerf having the cross sectional shape of kerf 30a.

Preferably, the kerf 30b are formed so that the shoulders 69 of the kerf 30b not only abut when the insulation board 20 is bent into a desired tubular configuration of preselected transverse dimensions, but the shoulders are pressed together, when the insulation board is formed into the desired tubular configuration of the preselected transverse dimensions, with sufficient force to compress the insulation material in the shoulders 69 of the kerf 30b so that the tubular shape of the duct or duct liner formed from the insulation board 20 is retained after the insulation board has been formed into a duct or duct liner. Most preferably, the kerf 30b is formed so that the insulation material in the sidewalls of the kerf 30b, for the entire depth or substantially the entire depth of the kerf, is subjected to compression when the insulation board 20 is bent into the desired tubular configuration of the preselected transverse dimensions to eliminate or substantially eliminate the air spaces 70 and 72 and to further rigidify the duct or duct liner formed from the insulation board 20.

As shown in FIGS. 8 and 8A, the kerf 30c has a narrow vee-shaped transverse cross section with sidewalls 74 and 76 which meet at the base or bottom of the kerf 30c and extend to the gas stream surface of the insulation board 20. The sidewalls diverge with respect to each other and a plane 78, extending perpendicular to the gas stream surface 22 of the insulation board 20 and bisecting the kerf 30c along the longitudinal centerline of the kerf 30c, from the base of the kerf 30c to the gas stream surface 22 of the insulation board 20. The kerf 30c has shoulders 79 adjoining the gas stream surface 22 of the insulation board 20. When the insulation board 20 is bent or formed into a tubular configuration to form a duct or duct liner as shown in FIG. 8A, the shoulders 79 of the kerf 30c, adjoining the gas stream surface 22 of the insulation board 20, come together and the sidewalls abut along their surfaces so that no air space is formed in the wall of the duct or duct liner.

Preferably, the kerf 30c is formed so that the shoulders 79 of the kerf 30c not only abut when the insulation board is bent into a desired tubular configuration of preselected transverse dimensions, but the shoulders are pressed together, when the insulation board has been formed into the desired tubular configuration of the preselected transverse dimensions, with sufficient force to compress the insulation material in the shoulders 79 of the kerf 79 so that the tubular shape of the duct or duct liner formed from the insulation board 20 is retained after the insulation board has been formed into a duct or duct liner. Most preferably, the kerf 30c is formed so that the insulation material in the sidewalls of the kerf 30c, for the entire or substantially the entire depth of the kerf, is subjected to compression when the insulation board is bent into the tubular configuration of the preselected transverse dimensions to further rigidify the duct or duct liner formed from the insulation board 20.

As shown in FIGS. 9 and 9A, the kerf 30d has a narrow vee-shaped transverse cross section with sidewalls 80 and 82 which extend from a base or bottom of the kerf 30d to the gas stream surface 22 of the insulation board 20. The kerf 30d is like kerf 30c except, unlike kerf 30c, the sidewalls 80 and 82 of kerf 30d do not meet at the base of the kerf. Instead the sidewalls 80 and 82 are narrowly spaced from each other at the base of the kerf 30d and diverge with respect to each other and a plane 84, extending perpendicular to the gas stream surface 22 of the insulation board 20 and bisecting the kerf 30d along the longitudinal centerline of the kerf 30d, from the base of the kerf 30d to the gas stream surface 22 of the insulation board 20. The kerf 30d has shoulders 85 adjoining the gas stream surface 22 of the insulation board. When the insulation board 20 is bent or formed into a tubular configuration to form a duct or duct liner as shown in FIG. 9A, the shoulders 85 of the kerf 30d, adjoining the gas stream surface 22 of the insulation board 20, come together and a very narrow air space 86 is formed in the wall of the duct or duct liner at the bottom of the kerf 30d.

Preferably, the kerf 30d is formed so that the shoulders 85 of the kerf 30d not only abut when the insulation board 20 is bent into a desired tubular configuration of preselected transverse dimensions, but the shoulders are pressed together, when the insulation board is formed into the desired tubular configuration of the preselected transverse dimensions, with sufficient force to compress the insulation material in the shoulders 85 of the kerf 30d so that the tubular shape of the duct or duct liner formed from the insulation board 20 is retained after the insulation board has been formed into a duct or duct liner. Most preferably, the kerf 30d is formed so that the insulation material in the sidewalls of the kerf 30d, for substantially the entire depth of the kerf, is placed under compression when the insulation board is formed into the tubular configuration of the preselected transverse dimensions to substantially eliminate the air space 86 and further rigidify the duct or duct liner formed from the insulation board 20.

The widths of the kerf openings at the gas stream surface 22 of the insulation boards 20 must be controlled. If the longitudinally extending openings of the kerfs 30 are too wide at the gas stream surface of the insulation board 20, the openings may not close and the shoulders or the shoulders and other portions of the kerf sidewalls may not be compressed, as preferred, when the insulation board is formed into a tubular configuration of selected dimensions to form a duct or duct liner. The widths of the openings of the kerfs 30 of the present invention may be defined by a pair of planes 90 and 92 which extend from a common vertex point 94, located at the second major surface 24 of insulation board in the plane bisecting the kerf 30, through the junctures of the kerf sidewalls with the gas stream surface 22, as shown in FIGS. 6, 7, 8 and 9. The included angle X between these two planes ranges from about 3° to about 10° depending on the thickness of the insulation board and the diameter of the duct or duct liner being formed from the kerfed insulation board 20. The greater the thickness of the insulation board 20 being kerfed and the greater the diameter of the duct or duct liner being formed from the insulation board, the smaller the included angle X between the planes 90 and 92.

The flexibility of the insulation boards 20, in the direction of the widths of the insulation boards, may be controlled by the depths and/or the widths of and/or spacing between the kerfs 30 in the gas stream surface 22 of the insulation boards. An insulation board 20 with kerfs of a certain depth and width that are spaced from each other a certain spacing will exhibit a certain flexibility. To make the insulation boards more flexible, the depths of the kerfs 30 can be increased, the widths of the kerfs can be increased and/or the spacing between the kerfs 30 can be decreased. To make the insulation boards less flexible, the depths of the kerfs 30 can be decreased, the widths of the kerfs can be decreased and/or the spacing between the kerfs 30 can be increased. In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A method of kerfing insulation boards for forming ducts of preselected transverse dimensions having round or flat oval transverse cross sections, comprising:

provviding a rigid fibrous insulation board for forming a duct of preselected transverse dimensions; said insulation board having a coated first major surface forming an interior surface of a duct formed from said insulation board and a second major surface forming an outer surface of a duct formed from said insulation board; said insulation board having a length extending parallel to a longitudinal centerline of a duct formed from said insulation board, a width and a thickness;

forming a plurality of kerfs in said first major surface of said insulation board which make said insulation board flexible in a direction of said width of said insulation board and foldable into a tubular configuration of preselected transverse dimensions having a round or flat oval transverse cross section; each of said kerfs having a depth; each of said kerfs extending parallel with respect to and being spaced from other of said kerfs; each of said kerfs extending said length of said insulation board; each of said kerfs having sidewalls which extend from a kerf base portion adjacent but spaced inwardly from said second major surface of said insulation board to said first major surface of said insulation board; each of said kerfs having shoulder portions adjoining said first major surface; and each of said kerfs having a width at said first major surface of said insulation board said width of said kerfs at said first major surface of said insulation board pressing said shoulder portions of said kerfs into abutment with said insulation material in said shoulder portions in compression, when said insulation board is formed into a duct of said preselected transverse dimensions with said round or flat oval transverse cross section, to retain said insulation board in said round or flat oval transverse cross section with no exposure of said kerf sidewalls at the interior surface of the duct and any loose fibers or dust from said kerf sidewalls confined within said kerfs; and controlling said flexibility of said insulation board in said direction of said width of said insulation board by at least one of the following: said depth of said kerfs formed, said widths of said kerfs formed at said first major surface, and said spacing formed between said kerfs.

2. The method of kerfing insulation boards according to claim 1, wherein: said sidewalls of each of said kerfs diverge with respect to each other from said kerf base portion to said first major surface of said insulation board and each of said kerfs has a generally vee-shaped cross section.

3. A method of forming a duct having a round or flat oval transverse cross section, comprising:

providing a rigid fibrous insulation board having a coated first major surface forming an interior surface of a duct formed from said insulation board and a second major surface forming an outer surface of a duct formed from said insulation board; said insulation board having a length extending parallel to a longitudinal centerline of a duct formed from said insulation board, a width and a thickness;

forming a plurality of kerfs in said first major surface of said insulation board which make said insulation board flexible in a direction of said width of said insulation board and foldable into a tubular configuration of preselected transverse dimensions having a round or flat oval transverse cross section; each of said kerfs having a depth; each of said kerfs extending parallel with respect to and being spaced from other of said kerfs; each of said kerfs extending said length of said insulation board; each of said kerfs having sidewalls which extend from a kerf base portion adjacent but spaced inwardly from said second major surface of said insulation board to said first major surface of said insulation board; each of said kerfs having shoulder portions adjoining said first major surface;

controlling said flexibility of said insulation board in said direction of said width of said insulation board by at least one of the following: said depth of said kerfs formed, said widths of said kerfs formed at said first major surface, and said spacing formed between said kerfs;

bending said kerfed insulation board into a tubular configuration having a round or flat oval transverse cross section to form a duct with said kerfs extending parallel to a longitudinal centerline of said duct with said shoulder portions of said kerfs abutting and pressed together and insulation material in said shoulder portions in compression; the compression of said insulation material in said shoulder portions retaining said kerfed insulation board in said tubular configuration; there being no exposure of said kerf sidewalls at the interior surface of the duct and any loose fibers or dust from said kerf sidewalls being confined within said kerfs; and fixing said kerfed insulation board in said tubular configuration.

4. The method of forming a duct according to claim 3, wherein: said duct is a liner and including enclosing said duct within a tubular metal shell.

5. The method of forming a duct according to claim 3, wherein: said sidewalls of each of said kerfs diverge with respect to each other from said kerf base portion to said first major surface of said insulation board and each of said kerfs has a generally vee-shaped cross section.

6. The method of forming a duct according to claim 5, wherein: said duct is a liner and including enclosing said duct within a tubular metal shell.

* * * * *